US008833156B2

(12) United States Patent
Druyts et al.

(10) Patent No.: US 8,833,156 B2
(45) Date of Patent: Sep. 16, 2014

(54) METHOD AND DEVICE FOR DETERMINING A RHEOLOGICAL TRANSITION LEVEL

(75) Inventors: Marcus Philippus Maria Druyts, Bruges (BE); Peteralv Martien Brabers, Wintershoven (BE)

(73) Assignees: M.D.C.E. BVBA, Bruges—St. Kruis (BE); Demco NV, Wintershoven (BE)

( * ) Notice: Subject to any disclaimer, the term of this patent is extended or adjusted under 35 U.S.C. 154(b) by 454 days.

(21) Appl. No.: 13/378,571

(22) PCT Filed: Jun. 22, 2010

(86) PCT No.: PCT/BE2010/000046
§ 371 (c)(1),
(2), (4) Date: Feb. 14, 2012

(87) PCT Pub. No.: WO2010/148462
PCT Pub. Date: Dec. 29, 2010

(65) Prior Publication Data
US 2012/0131998 A1    May 31, 2012

(30) Foreign Application Priority Data
Jun. 26, 2009  (BE) .............................. BE2009/0386

(51) Int. Cl.
*G01C 5/00*    (2006.01)
*G01F 1/00*    (2006.01)
*G01C 13/00*   (2006.01)

(52) U.S. Cl.
CPC .................................... *G01C 13/008* (2013.01)
USPC .................. 73/170.29; 73/170.32; 73/170.33

(58) Field of Classification Search
None
See application file for complete search history.

(56) References Cited

U.S. PATENT DOCUMENTS

| 2,531,088 | A | 11/1950 | Thompson |
| 4,298,840 | A | 11/1981 | Bischoff et al. |
| 4,617,518 | A | 10/1986 | Srnka |
| 6,236,212 | B1 | 5/2001 | Wynn |
| 7,083,009 | B2 * | 8/2006 | Paluch et al. ................... 175/59 |
| 2005/0028974 | A1 * | 2/2005 | Moody ......................... 166/264 |
| 2005/0218914 | A1 | 10/2005 | Brabers |
| 2009/0001987 | A1 | 1/2009 | Davidsson |

FOREIGN PATENT DOCUMENTS

| BE | 1015773 | 8/2005 |
| EP | 0207038 | 12/1986 |
| JP | 6-160091 | 6/1994 |
| JP | 2000-65647 | 3/2000 |
| NL | 8902592 | 5/1991 |

* cited by examiner

*Primary Examiner* — Andre Allen
*Assistant Examiner* — Jermaine Jenkins
(74) *Attorney, Agent, or Firm* — Edward J. Baba; Bozicevic, Field & Francis LLP

(57) ABSTRACT

Method for determining the thickness of an upper layer of a fluid mass comprising at least this upper layer and a lower layer lying thereunder, such as a waterway with a navigable upper layer and a viscous mud layer located thereunder, wherein the viscosity of the fluid of the lower layer is greater than the viscosity of the fluid of the upper layer, wherein a body freely movable in the fluid mass is moved through the fluid mass at a velocity such that the body enters a state of equilibrium substantially at the interface between the lower and upper layer; the depth position of the body is determined at successive points in order to know the thickness of the upper layer at these points; and the resistivity of the fluid in the vicinity of the body is measured at successive points.

20 Claims, 4 Drawing Sheets

METHOD AND DEVICE FOR DETERMINING A RHEOLOGICAL TRANSITION LEVEL

The invention relates to an improved method and device for determining a rheological transition level between an upper layer and a more viscous lower layer of a fluid mass, such as a water channel with a navigable upper layer and a viscous mud layer thereunder.

Mud formation in water channels is a generally known phenomenon whereby the thickness of the navigable upper layer of water channel is limited. Three layers can generally be distinguished in a water channel: a water layer, a fluid mud layer and a viscous mud layer. The water layer and the fluid mud layer form a navigable upper layer. It is of great importance for ships to know precisely the thickness of this upper layer. This is because a ship which extends with its keel into the viscous mud layer is substantially uncontrollable, so that this is a situation which must be avoided at all times.

The present invention has for its object to provide an improved method and device of the type stated in the preamble with which important properties, of the upper layer, in particular of a navigable upper layer of water channel, can be determined in a more reliable manner and with which, if desired, additional properties of the fluid mass in the vicinity of the transition between upper and lower layer can be derived.

The method according to the invention is distinguished for this purpose in that a body freely movable in the fluid mass is moved through the fluid mass at a velocity such that the body enters a state of equilibrium substantially at the interface between the lower and upper layer. The depth position of the body is determined here at successive points in order to know the thickness of the upper layer at these points, and the resistivity of the fluid in the vicinity of the body is also measured at successive points.

By being moved at an appropriate velocity the body will undergo a drag force directed substantially parallel to the lower layer. This drag force will be greater in the lower layer than in the upper layer, since the viscosity of the lower layer is greater than that of the upper layer. Owing to the difference in drag force the body; when situated in the lower layer, will tend at an appropriate velocity to move to a position in the upper layer, while the body, when situated in the upper layer, will on the contrary tend to move to a position in the lower layer. This has the consequence that the body will enter a state of equilibrium at the interface between the upper and lower layers. The thickness of the upper layer can thus be determined on the basis of this depth position. By performing the resistivity measurements more information can be derived from the properties of the transition and/or it is possible to determine whether the body is always situated at this transition level at the successive points, this as control of the correctness of the depth determination.

According to a preferred embodiment of the method according to the invention, in the case a resistivity is measured which satisfies a determined condition, and in particular in the case a resistivity is measured which is lower than a determined value, it is determined that the body is no longer situated at the interface between the upper and lower layers. In such a situation the velocity at which the body is moved through the fluid mass can for instance be reduced.

In the case of a waterway with an upper layer of fluid mud and a lower layer of consolidated (viscous) mud the following values typically apply for the resistivity. For the viscous mud the resistivity lies typically between 0.30 ohm meter and 0.50 ohm meter, and still more typically between 0.31 ohm meter and 0.45 ohm meter. The fluid mud and the water typically have a resistivity lower than 0.27 ohm meter. If the resistivity measured in such a waterway falls below about 0.30 ohm meter, it can be determined herefrom that the contact with the viscous mud is broken, i.e. the cable is floating. In such a situation measures will typically be taken, such as reducing the towing speed, in order to restore the contact.

According to a preferred embodiment, the velocity is higher than a minimum velocity and lower than a maximum velocity, the minimum velocity and maximum velocity substantially being a function of the viscosity of the lower layer and of the form and the weight of the body. On the one hand a sufficiently great drag force is in this way exerted on the body when it is situated in the lower layer, and on the other a sufficiently small drag force is exerted on the body when it is situated in the upper layer, such that the body moves in all cases to a position of equilibrium at the interface between the upper and lower layers.

According to a preferred embodiment, the depth position is determined by measuring the static water pressure at the location where the body is situated. In the case of an upper layer with a lower layer (for instance a fluid mud layer) and an upper water layer, the static water pressure is for instance measured in an isolated space connected to the body, the space being brought into contact with the upper water layer. Since the static water pressure is a function of the depth position of the body, and therefore of the thickness of the upper layer, this latter can be easily determined.

The body is preferably introduced into the fluid using a flexible cable, which cable is pulled along so as to move the body at the determined velocity, for instance by connecting the cable to a vessel. Note that other moving techniques are also possible. These moving techniques can use pulling means, such as a cable or a tow rope, as well as pushing means, wherein these must be embodied such that the body can move freely up and downward. Further note that the depth position could also be determined on the basis of the angle which the cable makes with the surface of the upper layer.

According to an advantageous embodiment the resistivity is measured by transmitting a current through the vicinity of the body, measuring one or more voltage differences generated by this current and deriving the resistivity therefrom.

According to another possible embodiment, the body is moved on the outer end of a stiff tube instead of a flexible cable. In such an embodiment the depth position could be determined on the basis of the angle which the tube makes with the surface of the upper layer.

The invention further relates to a device for determining the thickness of an upper layer of a fluid mass comprising at least this upper layer and a lower layer lying thereunder, such as a waterway with a navigable upper layer and a viscous mud layer located thereunder, wherein the viscosity of the lower layer is greater than the viscosity of the upper layer. The device comprises a body adapted to be moved in the fluid mass; means for measuring the resistivity in the vicinity of the body; and means for measuring a variable from which the depth position of the body can be derived.

According to the preferred embodiment, the device comprises a cable and the body is formed by the end part of the cable, optionally in combination with one or more elements, such as weights and/or electrodes, connected thereto. The length of the cable is preferably at least twice the depth of the upper layer, and still more preferably about three times the depth of the upper layer.

According to a preferred embodiment, the means for measuring the resistivity in the vicinity of the body comprise a plurality of electrodes connected at different locations to the body, this such that using two or more electrodes thereof a current can be transmitted through the vicinity of the body and that a voltage difference can hereby be generated, wherein the ratio of the voltage difference and the current is a measure for the resistivity.

According to a preferred embodiment, the means for measuring a variable from which the depth position of the body can be derived is a pressure sensor for measuring the water pressure in the vicinity of the body. According to an advantageous embodiment suitable for use in an upper layer with a fluid mud layer and a water layer located thereabove, a number of pressure conduits are provided which debouch in the housing. These pressure conduits preferably have a length such that during operation, i.e. when the body is situated in the vicinity of the interface between lower layer and upper layer, they are connected to the water layer.

According to another further developed embodiment intended for use in an upper layer consisting of a fluid mud layer and a water layer located thereabove, the device comprises a cable on which a number of sensors for measuring the salt content are arranged in the part of the cable typically situated during use in the water layer of the upper layer.

According to a possible embodiment of the device according to the invention, the body is provided on one side with a wing element for obtaining a greater or smaller lifting force when the body is towed through the fluid. This wing element can take an adjustable form. This has the advantage that the body can be modified in a simple manner to the operating conditions and to the nature of the upper and lower layers.

According to a further developed embodiment of the device according to the invention, the body is provided with a keel element for the purpose of increasing or reducing the drag force exerted on the body during towing. This keel element can likewise take an adjustable form such that a modification of the body can be carried out easily.

The invention will now be further elucidated on the basis of a number of non-limitative exemplary embodiments of the method and device of the invention, which are illustrated on the basis of the accompanying drawings which are discussed below. In the drawings.

Figure 1:
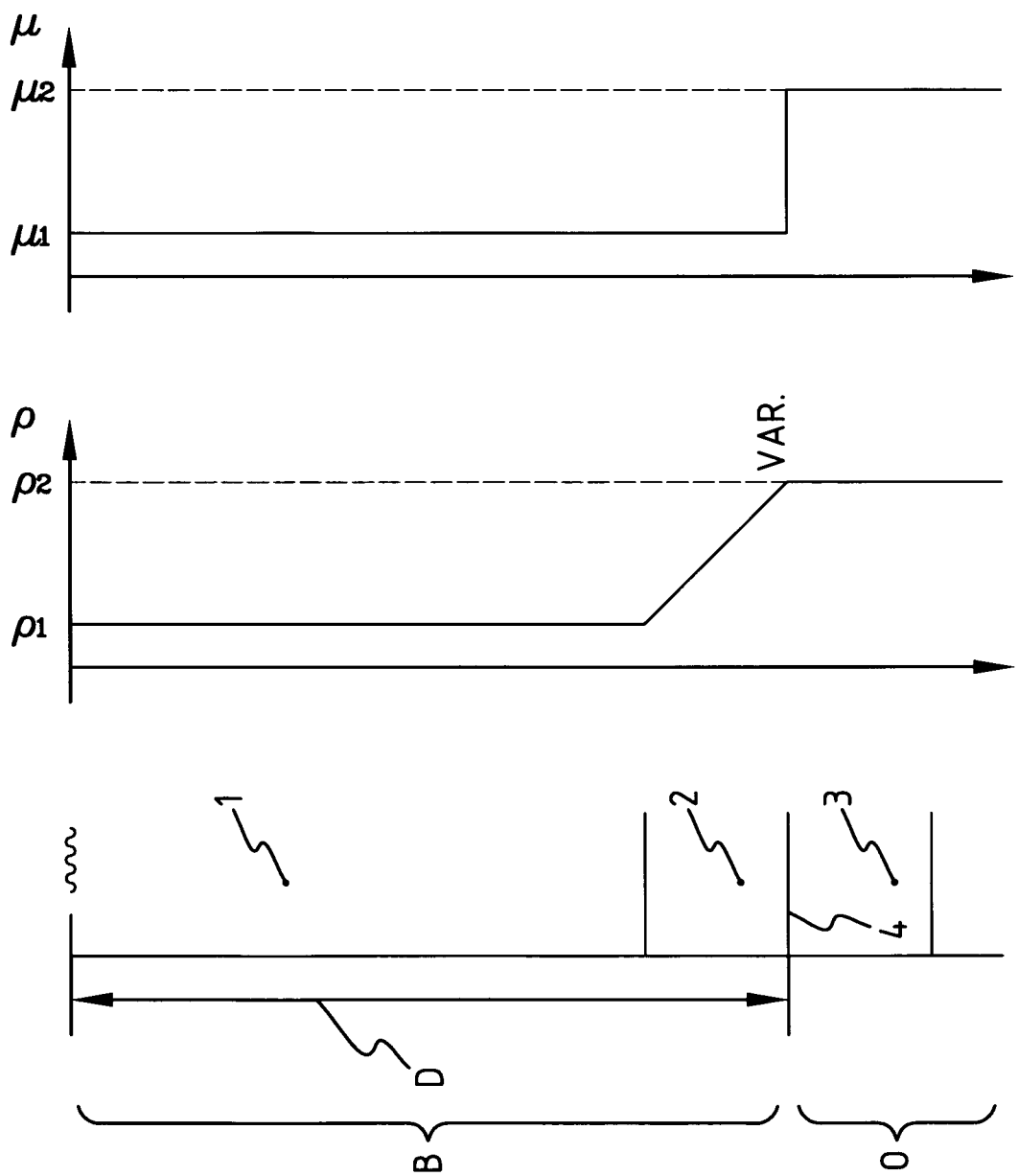
FIG. 1 shows schematically the different layers typically present in a water channel; and the variation in the mass density and the viscosity in these layers.

In a water channel such as a river or a harbour it is possible to distinguish substantially the layers shown in FIG. 1: a water layer 1, a fluid mud layer 2 and a viscous mud layer 3. Water layer 1 and the viscous mud layer 2 form a navigable upper layer B. When the keel of a vessel extends into the viscous mud layer 3, the vessel becomes uncontrollable, and it is therefore of great importance for shipping to know the depth of this rheological transition level between the navigable upper layer B and the viscous lower layer O.

As shown in the characteristic of the mass density $\rho$ in FIG. 1, the mass density in water layer 1 is substantially constant and equal to $\rho_1$. This mass density increases gradually in the fluid mud layer 2 and is substantially constant and equal to $\rho_2$ in the viscous mud layer 3. The variation in the mass density 9 close to interface layer 4 of fluid mud layer 2 and viscous mud layer 3 indicates that the mass density $\rho$ is not suitable as parameter for finding this interface layer 4: the differences in density above and below this interface layer are minimal.

FIG. 1 also shows the characteristic of the viscosity $\mu$ in the different layers. In the fluid upper layer the viscosity is substantially constant and equal to $\mu_1$. The viscosity shows an abrupt rise at the position of the interface layer 4 between the upper and lower layers, and is substantially constant and equal to $\mu_2$ in the lower layer. It is the case that, in contrast to the density $\rho$, the viscosity $\mu$ is highly suitable as parameter for determining this interface layer 4: the differences above and below interface layer 4 are by definition great.

It is also the case that the resistivity increases very rapidly in the vicinity of the interface layer. For the viscous mud the resistivity lies typically between 0.31 ohm meter and 0.45 ohm meter or higher. The fluid mud and the water typically have a resistivity lower than 0.27 ohm meter. The resistivity thus displays a reasonably abrupt transition close to the interface layer, so that this can be used as parameter to verify the contact with the interface layer.

When a body is moved at a determined velocity v, different forces act on the body:
  a downward directed resultant G of the gravitational force and the Archimedean force;
  an upward directed lifting force L independent of the viscosity of the fluid; and
  a drag force proportional to the viscosity: $D\mu_1$ for the upper layer and $D\mu_2$ for the lower layer.

This results in a pulling force exerted on the body: $T\mu_2$ in the lower layer and $T\mu_1$ in the upper layer, see FIG. 3.

Figure 2:
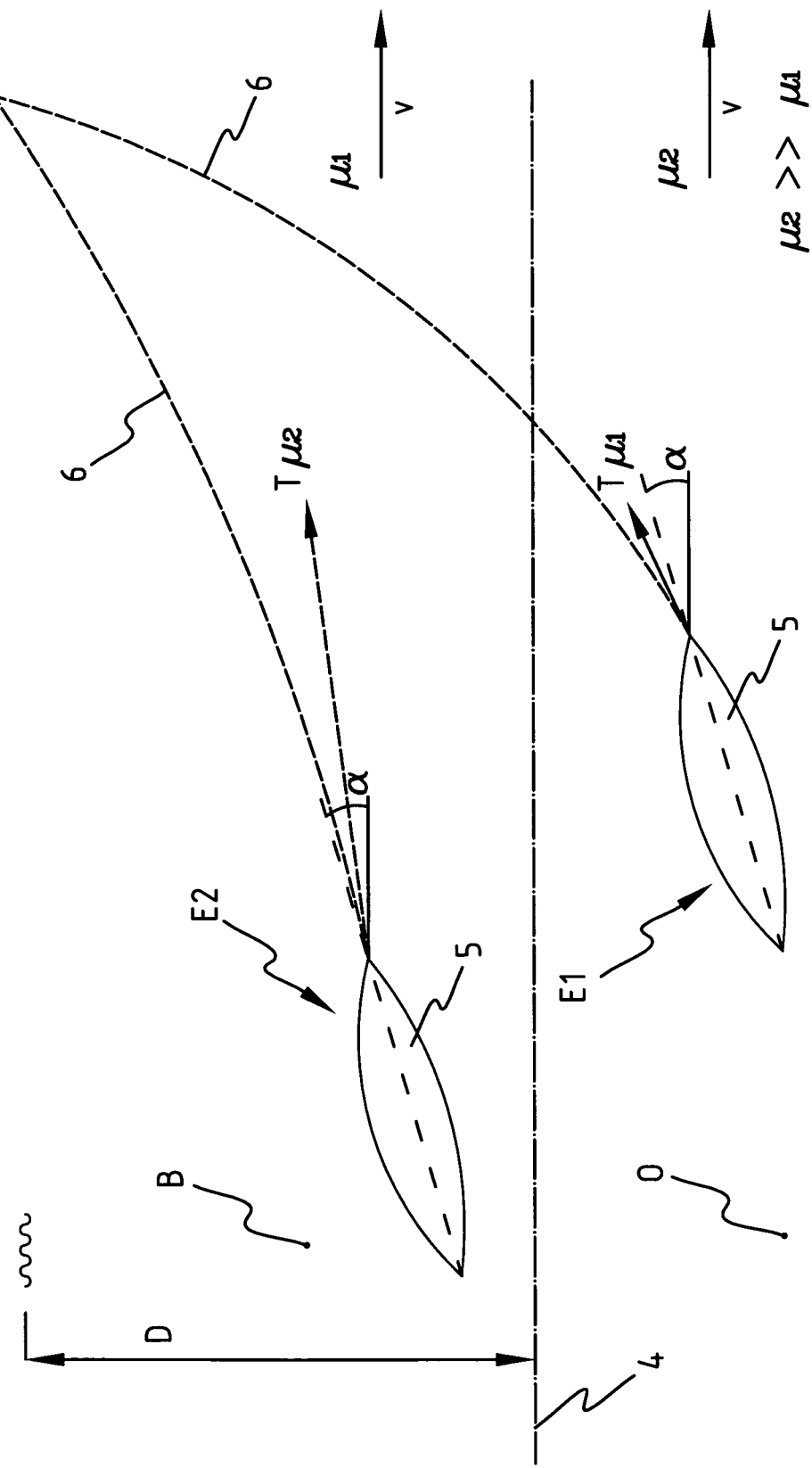
FIG. 2 shows two fictitious positions of equilibrium of the body for respectively a medium with a viscosity $\mu_1$ and a medium with a viscosity $\mu_2$.

FIG. 2 shows two fictitious positions of equilibrium when the body is moved using a cable. The first fictitious position of equilibrium E1 is the position of equilibrium if the body were to be moved at a determined velocity v in a medium with viscosity $\mu_1$. The second fictitious position of equilibrium E2 is the position of equilibrium if the body were to be moved at a determined velocity v in a medium with viscosity $\rho_2$. If the body is moved in a fluid mass with an upper layer having a viscosity $\mu_1$ and a lower layer having a viscosity $\mu_2$, and interface layer 4 lies between these two positions of equilibrium as shown in FIG. 2, the body will tend, when it is situated in lower layer O, to move toward the second fictitious position of equilibrium E2, while the body will tend, when it is situated in upper layer B, to move toward the first fictitious position of equilibrium E1. After a time the body will in theory hereby reach a stable position lying on interface layer 4 between upper layer B and lower layer O. This is elucidated in further detail in the Belgian patent BE 1015773 in the name of applicant.

According to an embodiment of the method of the invention, a body 5 is thus introduced into fluid mass B, O, after which the body is moved at a determined velocity v in a direction substantially parallel to the lower layer O. The body moves into its position of equilibrium at the interface between the lower layer and the upper layer, wherein the depth position of body 5 is determined and the thickness D of upper layer B is determined making use of the depth position of body 5, wherein resistivity measurements are performed in the vicinity of body 5 for the purpose of deriving data about the nature of the mud and/or as control for a good contact between the body and lower layer O. If the body loses contact with the interface between lower and upper layers, the body will after all typically then move into a higher part of the upper layer having a different resistivity, and in particular a lower resistivity. A significant change in the resistivity will thus be detected when the body no longer makes contact with the lower layer.

With this embodiment of the method according to the invention particularly the following can thus be determined, individually or in combination:

owing to the enormous differences in viscosity between lower and upper layers the body (for instance a number of weights attached to the outer end of a cable) remains positioned at the interface between the upper and lower layers. The depth of the interface between upper and lower layers can thus be determined by measuring the depth of this body;

the contact between the body and the interface can be monitored by means of the resistivity measurements, wherein possible measures can be taken in the case contact is broken;

the morphology (composition) of the mud at the interface can be determined on the basis of the resistivity measurements.

If operation takes place with more than two potential electrodes such that different potential measurements can be performed, using the different distances between the electrodes the resistivity in the solid mud layer can then be determined at different depths, and a full 3-D image of the resistivity can hereby be created.

According to a further developed variant of the invention which finds application in an upper layer consisting of a fluid mud layer and a water layer lying thereabove, the method can likewise comprise of measuring the thickness of the fluid mud layer on the basis of acoustic signals. A 210 kHz signal can for instance thus be generated underwater, the signal being reflected on the surface of the fluid mud layer. The depth of the transition between the water layer and the liquid mud layer can in this way be determined. The thickness of the fluid mud layer can thus be determined in combination with determining the depth of the transition between the fluid and solid mud layers.

A series of penetration measurements can further be performed in order to determine the density profile of the fluid mud layer. On the basis hereof it is possible to know the influence of the fluid mud layer on the resistivity measurements. It will in this way be possible to build up a complete picture of the morphology of the mud bottom.

Note however that for a typical embodiment of the method of the invention the thickness and composition of the viscous mud layer is of no interest, and therefore only two potential electrodes are typically provided and are sufficient to measure the said differences (contact with viscous mud/no contact with viscous mud).

Figure 3:
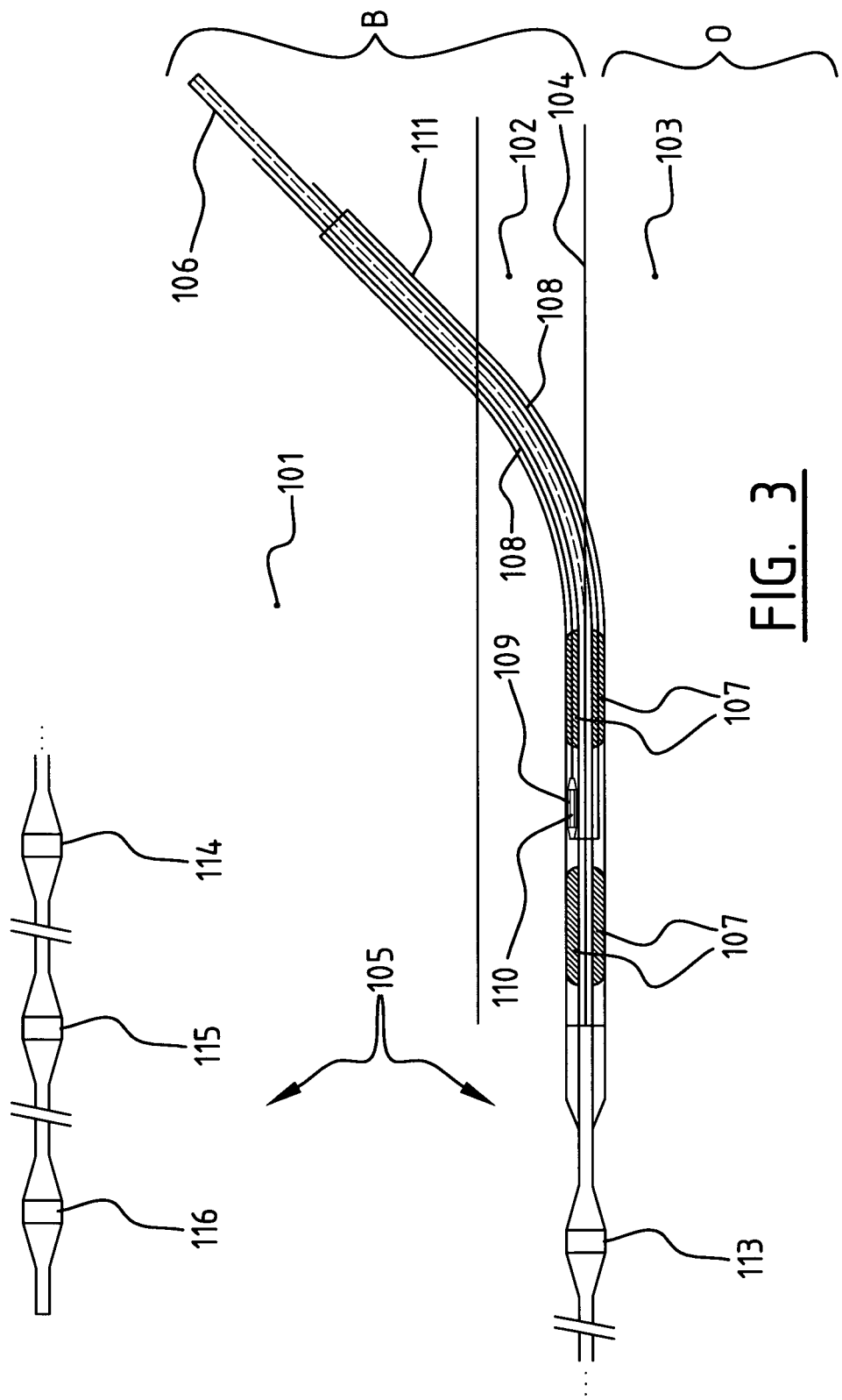
FIG. 3 is a schematic view of a first embodiment of a device according to the invention.

FIG. 3 shows a first embodiment of a device according to the invention for determining the thickness of an upper layer B of a fluid mass comprising at least this upper layer B and a lower layer O lying thereunder. The device comprises a body 105 adapted to be moved in fluid mass 101, 102, 103. Body 105 is formed here by an end part of a cable 106 around which a number of weights 107 are provided and on which a number of electrodes 113-116 are arranged. Note that the end part can have a considerable length, and can for instance be more than 100 meters long.

Weights 107 are received here in a sheath 111 and consist of a number of tubular elements arranged around a central multichannel cable 106. Further provided in sheath 111 between two tubular weights 107 is an isolated housing 109 in which a pressure sensor 110 is received. This housing 109 is connected by means of two pressure conduits 108 to water layer 101 of upper layer B. The actual water depth can hereby be derived on the basis of the pressure measurements and knowledge of the density of water. The reason for this configuration is that the fluid mud 102 typically has a density which can amount to 1.1 kg/m$^3$. In the case of a relatively thick fluid mud layer (for instance 4 meters), this will thus result in a considerably higher pressure than in the case the whole upper layer were to consist solely of water, and information about the thickness of the fluid mud layer would thus be necessary to enable the depth to be derived in accurate manner from the pressure measurement.

It is further noted that in the case of salt water the density of the water also depends on the salt content. For this reason it may be advantageous to measure the salt content (or the density) of the water. This can for instance be realized by providing a number of conductivity-temperature-depth recorder (CTD) sensors arranged distributed on the cable in the part typically situated in water layer 101. An even more accurate result can be obtained by including these measurements of the salt content in the depth calculation based on the measured pressure.

The outer end of cable 106 is further provided with means for measuring the resistivity which consist here of two current electrodes 113, 116 and two potential electrodes 114, 115. Current electrodes 113, 116 are connected via electric wires running through cable 26 to a power source for transmitting a current, typically a number of current pulses, from electrode 113 through the fluid mass to electrode 116, wherein a voltage difference is generated between electrodes 114, 115 which is measured via measuring means (not shown), typically a voltmeter.

Figure 4:
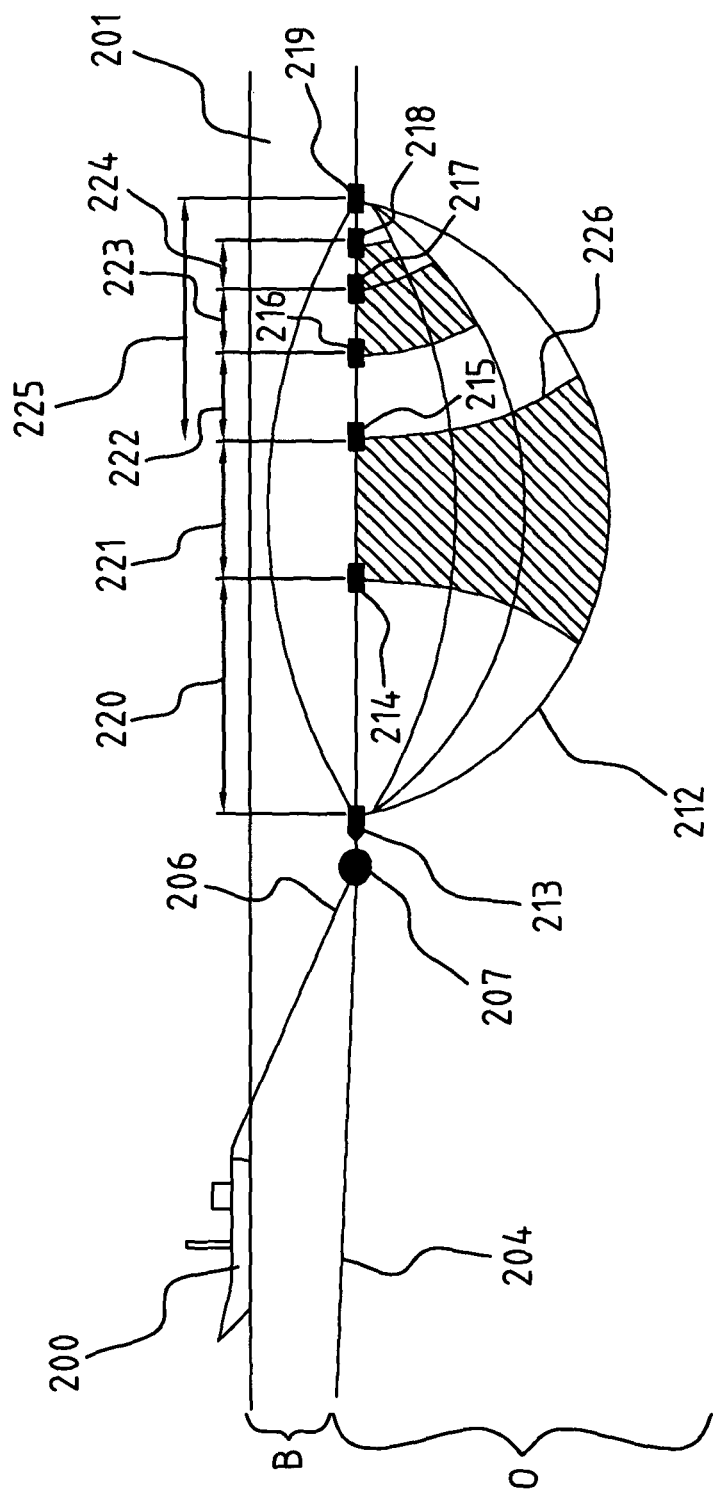
FIG. 4 is a schematic view of a second embodiment of a device according to the invention.

FIG. 4 shows a second embodiment of a device according to the invention for determining the thickness of an upper layer B of a fluid mass comprising at least this upper layer B and a lower layer O lying thereunder. The device comprises a cable 206 which is towed by a vessel 200. The length of cable 206 is typically about three times the water depth of the navigable upper layer B. The speed at which the ship sails is typically less than 5 knots, and for instance about 4 knots (2 m/s), although the skilled person will appreciate that the choice of this speed can be affected by the properties of the waterway.

The body is formed here by the outer end of cable 206 in combination with a weight 207 and a number of electrodes 213-219.

The means for measuring the resistivity in the vicinity of the body comprise a plurality of electrodes 213-219 connected at different locations to the body, this such that using two or more electrodes hereof a current can be transmitted through the vicinity of the body and that a voltage difference can hereby be generated. In the shown embodiment a current I is transmitted from electrode 213 through the vicinity of interface 204 to electrode 219. The distance between current electrodes 213 and 219 is typically between 2 m and 4 m, and is for instance about 3 m. Lines 212 are the current lines corresponding to this current I and lines 226 are the equipotential lines. A series of voltage differences 220-225 can further be measured. From these voltage differences the resistivity of the fluid mass, typically mud, in the vicinity of the interface can then be determined, as for instance described in detail in the U.S. Pat. No. 7,132,831 in the name of applicant, which is incorporated herein by reference.

The skilled person will appreciate that the invention is not limited to the above illustrated exemplary embodiments of the method and device according to the invention, but that the method can likewise be applied for the purpose of determining the thickness of an upper layer of a random fluid mass comprising at least this upper layer and a lower layer located thereunder when there is an appreciable difference in viscosity between the upper and lower layers. The scope of protection of the invention is therefore defined solely by the following claims.

The invention claimed is:

1. Method for determining the thickness of an upper layer of a fluid mass comprising at least this upper layer and a lower layer lying thereunder, such as a waterway with a navigable upper layer and a viscous mud layer located thereunder, wherein the viscosity of the fluid of the lower layer is greater than the viscosity of the fluid of the upper layer, wherein the method comprises the steps of:
 moving a body freely movable in the fluid mass through the fluid mass at a velocity such that the body enters a state of equilibrium substantially at the interface between the lower and upper layer;
 determining the depth position of the body at successive points in order to know the thickness of the upper layer at these points; and
 measuring the resistivity of the fluid in the vicinity of the body at successive points.

2. Method of claim 1, further comprising verifying whether the resistivity satisfies a determined condition in order to determine whether or not the body is situated at the interface between the upper and lower layers.

3. Method of claim 2, wherein the verifying comprises verifying whether the resistivity is lower than a determined value, and wherein, if this is the case, it is determined that the body is not making contact with the lower layer.

4. Method of claim 2, wherein, if it is determined that the body is not making contact with the lower layer, the velocity at which the body is moved through the fluid mass is reduced in order to restore the contact.

5. Method of claim 1, wherein the moving is done at a velocity which is higher than a minimum velocity and lower than a maximum velocity, the minimum velocity and maximum velocity substantially being a function of the viscosity of the lower layer and of the form and the weight of the body.

6. Method of claim 1, wherein the depth position is determined by measuring the static water pressure at the location where the body is situated.

7. Method of claim 6, wherein the static water pressure is measured in an isolated space connected to the body, the space being brought into contact with a higher-lying part of the upper layer.

8. Method of claim 1, wherein the resistivity is measured by transmitting a current through the vicinity of the body, measuring one or more voltage differences generated by this current and deriving the resistivity therefrom.

9. Method of claim 1, wherein the body is formed by the outer end of a cable to which one or more weights are connected, wherein the forward movement takes place by towing the cable through the fluid mass.

10. Method of claim 1, wherein the depth position is determined on the basis of the angle which the cable makes with the surface of the upper layer.

11. Device for determining the thickness of an upper layer of a fluid mass comprising at least this upper layer and a lower layer lying thereunder, such as a waterway with a navigable upper layer and a viscous mud layer located thereunder, wherein the viscosity of the lower layer is greater than the viscosity of the upper layer, comprising:
 a body adapted to be moved in the fluid mass;
 means for measuring the resistivity in the vicinity of the body;
 means for measuring a variable from which the depth position of the body being derived.

12. Device of claim 11, wherein the device comprises a cable and wherein the body is formed by an end part of the cable.

13. Device of claim 12, wherein the body is formed by an end part of the cable in combination with one or more elements connected thereto.

14. Device of claim 12, wherein means for measuring the resistivity in the vicinity of the body comprise a plurality of electrodes connected at different locations to the body, this such that using two or more electrodes thereof a current can be transmitted through the vicinity of the body and that one or more voltage differences can hereby be generated, the one or more voltage differences divided by the current being a measure for the resistivity.

15. Device of claim 11, wherein the means for measuring a variable from which the depth position of the body can be derived comprise a pressure sensor connected to the body for measuring the pressure in the vicinity of the body.

16. Device of claim 15, wherein the pressure sensor is received in a housing into which a number of pressure conduits debouch, which pressure conduits during operation, i.e. when the body is situated in the vicinity of the interface between lower layer and upper layer, are connected to a higher-lying part of the upper layer.

17. Device of claim 16, wherein the device comprises a cable and wherein said pressure conduits extend along the cable.

18. Device of claim 11, intended for use in an upper layer consisting of a fluid mud layer and a water layer located thereabove, wherein the device comprises a cable and wherein a number of sensors for measuring the salt content are arranged on the cable in the part of the cable typically situated in the water layer of the upper layer during use.

19. Device of claim 15, wherein determining means are provided for determining the depth position of the body, said determining means being adapted to calculate the depth on the basis of one or more pressure measurements performed by the pressure sensor.

20. Device of claim 18, wherein determining means are provided for determining the depth position of the body, said determining means being adapted to calculate the depth on the basis of one or more pressure measurements performed by the pressure sensor, taking into account salt content measurements performed by the salt content sensors.

* * * * *